United States Patent
Dobrich

(10) Patent No.: US 12,053,008 B2
(45) Date of Patent: Aug. 6, 2024

(54) MICROWAVABLE FROZEN DUMPLINGS AND METHODS THEREOF

(71) Applicant: AJINOMOTO CO., INC., Tokyo (JP)

(72) Inventor: Allison Dobrich, Ontario, CA (US)

(73) Assignee: AJINOMOTO CO., INC., Tokyo (JP)

( * ) Notice: Subject to any disclaimer, the term of this patent is extended or adjusted under 35 U.S.C. 154(b) by 0 days.

(21) Appl. No.: 17/454,628

(22) Filed: Nov. 12, 2021

(65) Prior Publication Data

US 2022/0151268 A1    May 19, 2022

Related U.S. Application Data

(60) Provisional application No. 63/113,376, filed on Nov. 13, 2020.

(51) Int. Cl.
| | |
|---|---|
| *A23L 5/10* | (2016.01) |
| *A21D 2/18* | (2006.01) |
| *A21D 13/047* | (2017.01) |
| *A21D 13/31* | (2017.01) |
| *A23L 3/36* | (2006.01) |
| *A23L 7/109* | (2016.01) |

(52) U.S. Cl.
CPC .............. *A23L 5/15* (2016.08); *A21D 2/188* (2013.01); *A21D 13/047* (2017.01); *A21D 13/31* (2017.01); *A23L 3/363* (2013.01); *A23L 5/13* (2016.08); *A23L 7/11* (2016.08); *A23V 2002/00* (2013.01)

(58) Field of Classification Search
CPC .............. A23L 5/15; A23L 3/363; A23L 5/13; A23L 7/11; A23L 13/03; A23L 13/62; A23L 17/75; A23L 19/05; A23L 13/57; A21D 2/188; A21D 13/047; A21D 13/31; A21D 13/19; A23V 2250/51082; A23V 2200/21

See application file for complete search history.

(56) References Cited

U.S. PATENT DOCUMENTS

| | | |
|---|---|---|
| 6,030,821 A | 2/2000 | Soeda et al. |
| 6,139,894 A | 10/2000 | Hoshino et al. |
| 6,329,008 B1 | 12/2001 | Wada |
| 8,741,369 B2 | 6/2014 | Petrofsky et al. |
| 9,974,324 B2 | 5/2018 | Hori et al. |

(Continued)

FOREIGN PATENT DOCUMENTS

CN         103844155 A       6/2014

OTHER PUBLICATIONS

Translation of KR 2018/012587A (Year: 2018).*

(Continued)

*Primary Examiner* — Drew E Becker
(74) *Attorney, Agent, or Firm* — Oblon, McClelland, Maier & Neustadt, L.L.P.

(57) ABSTRACT

A method of making a microwavable frozen dumpling, whereby a raw dumpling containing a dough and one or more filling ingredients is boiled to form a boiled dumpling, and the boiled dumpling is frozen to form the microwavable frozen dumpling. The dough of the microwavable frozen dumpling includes a rice flour, an oil, and a modified cellulose polymer, and has a moisture content of at least 52.0 wt. %. A method of preparing a cooked dumpling is also provided, whereby the microwavable frozen dumpling is heated in a microwave oven without covering the microwavable frozen dumpling.

30 Claims, 1 Drawing Sheet

(56) References Cited

U.S. PATENT DOCUMENTS

| | | | |
|---|---|---|---|
| 2003/0203076 A1 | 10/2003 | Watanabe et al. | |
| 2003/0206994 A1 | 11/2003 | Jahnke | |
| 2005/0153015 A1* | 7/2005 | Inoue | A21D 13/80 426/18 |
| 2006/0198933 A1* | 9/2006 | Sadakiyo | A23L 27/33 426/506 |
| 2006/0222740 A1* | 10/2006 | Kao | A21D 13/41 426/94 |
| 2006/0263489 A1* | 11/2006 | Kunishima | A21D 15/02 426/100 |
| 2012/0009299 A1* | 1/2012 | Xie | A21D 17/006 426/243 |
| 2013/0259981 A1* | 10/2013 | Hirae | A23L 5/41 426/94 |
| 2013/0323355 A1* | 12/2013 | Zhang | A21D 2/188 426/549 |
| 2015/0164115 A1* | 6/2015 | Chi-Kao | A23L 35/00 426/21 |
| 2015/0313244 A1* | 11/2015 | Lim | A21D 2/36 426/549 |
| 2016/0242438 A1* | 8/2016 | Hori | A23L 7/109 |
| 2016/0338395 A1 | 11/2016 | Kawata et al. | |
| 2018/0098560 A1* | 4/2018 | Yan | B65D 85/50 |
| 2023/0189850 A1* | 6/2023 | Sasaki | A23L 7/111 426/241 |

OTHER PUBLICATIONS

Translation of JP H05161462A (Year: 1993).*
Translation of JP 2005/065533A (Year: 2005).*
Soybean Oil NPL, https://bakerpedia.com/ingredients/soybean-oil/ (Year: 2016).*
Gluten-Free Dumpling Wrappers NPL, https://www.snixykitchen.com/gluten-free-dumpling-wrappers/ (Year: 2019).*
Translation of CN109221941A (Year: 2019).*
Translation of CN 1509654A (Year: 2004).*
Translation of JP H1156217A (Year: 1999).*
Translation of CN 105876770A (Year: 2016).*
Translated abstract for JP 03022941A (Year: 1991).*
Translation of CN 104381902A (Year: 2015).*
Human translation of CN 109221941A (Year: 2019).*
Massimiliano Della Mea, et al. "AtPng1p. The First Plant Transglutaminase" Plant Physiology, vol. 135, No. 4, Aug. 2004, pp. 2046-2054.

* cited by examiner

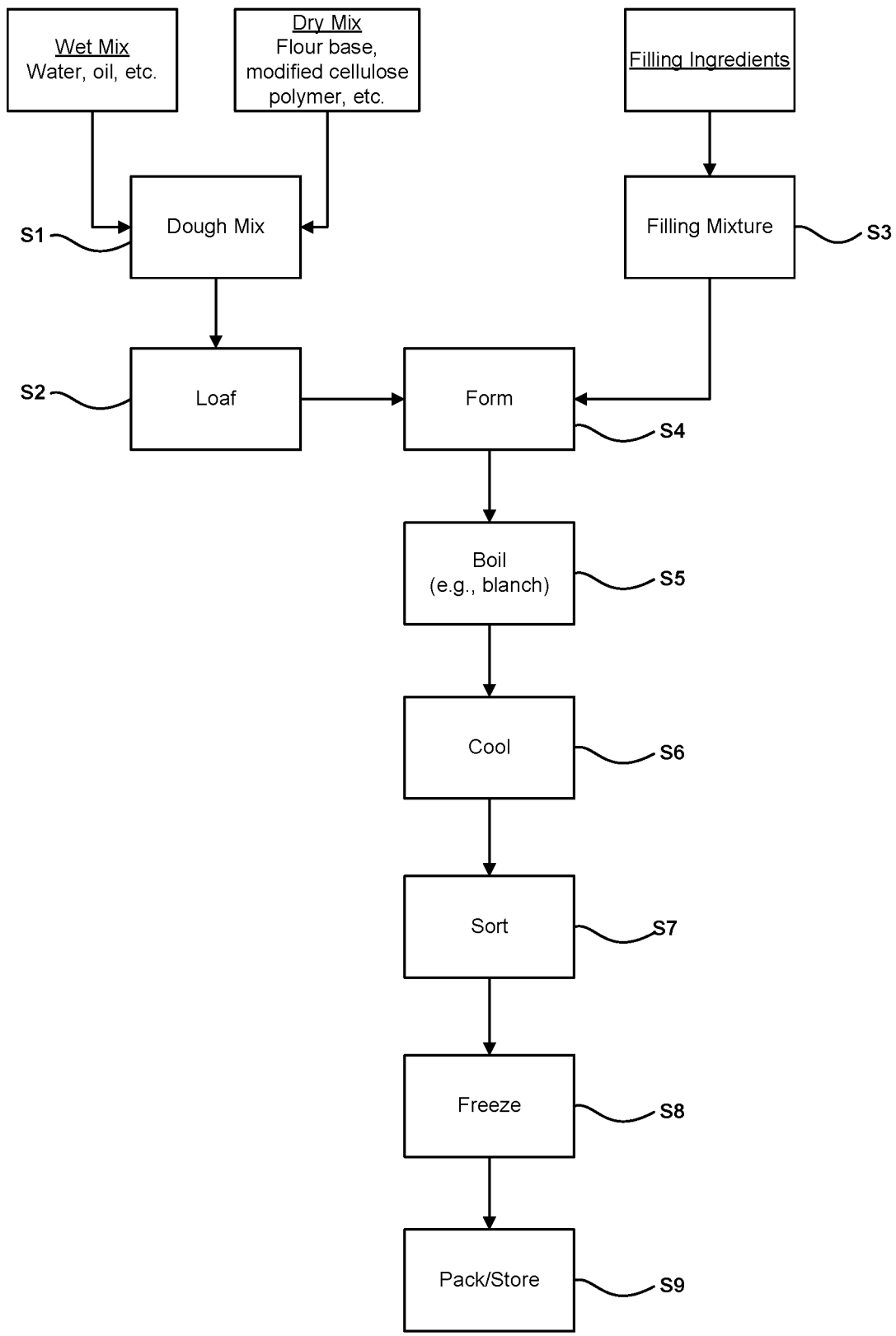

MICROWAVABLE FROZEN DUMPLINGS AND METHODS THEREOF

BACKGROUND OF THE INVENTION

Field of the Invention

The present invention relates to microwavable frozen dumplings, methods of making the microwavable frozen dumplings, and methods of preparing cooked dumpling from the microwavable frozen dumplings.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

A dumpling generally consists of a dough-based skin wrapped around an inner filling made of vegetable and/or meat ingredients. Conventionally, dumplings are steamed for 20 to 40 minutes at 95 to 100° C. to fully cook the inner ingredients to the requisite inner temperature while at the same time cooking the dough to form the familiar and desirable skin texture consumers find enjoyable. However, owing to the time consuming nature of conventional steaming processes, food manufacturers have long sought to develop frozen dumplings which can be heated using microwave ovens to a fully acceptable form equivalent to that made by conventional steaming processes.

While microwave heating of frozen food products offers unmatched convenience and safety, the unique heating mechanism of microwave ovens—which heat the food product from the inside out in a short period of time—can create problems for the re-heating of certain food products containing dough such as dumplings. For example, the dough portion of dumplings (which is an unleavened dough) tends to exhibit excessive toughening, firming, bubbling and/or cracking when heated in a microwave oven, providing the dumplings with an unpleasant hard, rubbery, or gummy texture. Such textural problems are exacerbated overtime as the microwaved dumpling is left to stand and as moisture on the surface of the skin evaporates.

In attempts to improve the textural properties of dough-containing food products microwaved from a frozen state, one approach involves the addition of certain dough additives such as starches, gelling agents, hydrocolloids such as xanthan gum, sugars, surfactants such as monoglycerides, enzymes, etc., examples of which are disclosed in CN103844155A, U.S. Pat. No. 8,741,369B2, US2003/0206994A1, US2016/0338395A1, and U.S. Pat. No. 6,139,894—each incorporated herein by reference in its entirety. Yet, even with the incorporation of these additives, microwaved dumpling products still fall short with respect to textural properties when compared to dumplings obtained through traditional steaming processes.

Another approach to improve the microwavability of frozen dumplings and related food products involves the use of microwave coverings (e.g., plastic wraps, wetted coverings, microwavable plastic coverings, etc.), specialty containers (e.g., those designed to hold water and contact the dumpling with water throughout the cooking process, for example, steamable packaging), or specialty heating packaging such as heat susceptors or microwave-absorbing heat generators, for example those described in U.S. Pat. No. 6,329,008B1, US2003/0203076A1, and U.S. Pat. No. 9,974,324B2—each incorporated herein by reference in its entirety. However, these approaches can be cumbersome for the consumer, costly for the manufacturer, and in general diminish the convenience of the microwave heating process.

SUMMARY OF THE INVENTION

In view of the forgoing, there exists a need for frozen dumplings which can be prepared in a microwave oven by simply placing the frozen dumpling onto a standard microwavable dish, without the need for coverings, specialty containers, or specialty heating packaging, to provide cooked dumplings with a moist and tender skin texture similar to traditional steamed dumplings.

Accordingly, it is one object of the present invention to provide novel microwavable frozen dumplings meeting the above criteria.

It is another object of the present disclosure to provide novel methods for making the microwavable frozen dumplings.

It is another object of the present disclosure to provide novel methods for preparing cooked dumplings through microwave heating of the microwavable frozen dumplings.

These and other objects, which will become apparent during the following detailed description, have been achieved by the inventors' discovery that doughs containing a combination of rice flour, oil, and a modified cellulose polymer, when subjected to a boiling-freezing process, bind water at a higher than normal rate, and enable the frozen dumpling to be microwaved from frozen state without the need for coverings, specialty containers, or specialty heating packaging, to provide cooked dumplings with excellent textural properties.

Thus, the present invention provides:

(1) A method of making a microwavable frozen dumpling, comprising:
  boiling a raw dumpling comprising a dough and one or more filling ingredients to form a boiled dumpling; and
  freezing the boiled dumpling to form the microwavable frozen dumpling;
  wherein the dough comprises a rice flour, an oil, and a modified cellulose polymer.

(2) The method of (1), wherein the rice flour is present in the dough an amount of 2 to 10 wt. %, based on a total weight of the dough.

(3) The method of (1) or (2), wherein the rice flour is glutinous rice flour.

(4) The method of any one of (1) to (3), wherein the dough further comprises a wheat flour.

(5) The method of (4), wherein the wheat flour is present in the dough in an amount of 50 to 75 wt. %, based on a total weight of the dough.

(6) The method of (4) or (5), wherein a weight ratio of the wheat flour to the rice flour is from 10:1 to 20:1.

(7) The method of any one of (1) to (6), wherein the oil is present in the dough in an amount of 0.5 to 5 wt. %, based on a total weight of the dough.

(8) The method of any one of (1) to (7), wherein the oil is soybean oil.

(9) The method of any one of (1) to (8), wherein the modified cellulose polymer is present in the dough in an amount of 0.1 to 5 wt. %, based on a total weight of the dough.

(10) The method of any one of (1) to (9), wherein the modified cellulose polymer is carboxymethyl cellulose.

(11) The method of any one of (1) to (10), wherein a total weight of the oil and the modified cellulose polymer in the dough is from 0.6 to 1.8 wt. %, based on a total weight of the dough.

(12) The method of any one of (1) to (11), wherein the dough is substantially free of xanthan gum.

(13) The method of any one of (1) to (12), wherein the raw dumpling is boiled by hot water blanching.

(14) A microwavable frozen dumpling, which is produced by the method of any one of (1) to (13).

(15) The microwavable frozen dumpling of (14), wherein the dough has a moisture content of at least 52.0 wt. %.

(16) A method of preparing a cooked dumpling, comprising:
heating the microwavable frozen dumpling of (14) or (15) in a microwave oven without covering the microwavable frozen dumpling.

(17) The method of (16), wherein the microwavable frozen dumpling is heated in the microwave oven without the use of a heat susceptor or a microwave-absorbing heat generator.

(18) The method of (16) or (17), wherein the microwavable frozen dumpling is not in contact with water during the heating.

(19) A microwavable frozen dumpling, comprising:
a dough and one or more filling ingredients;
wherein the dough comprises a rice flour, an oil, and a modified cellulose polymer, and
wherein the dough has a moisture content of at least 52.0 wt. %.

(20) The microwavable frozen dumpling of (19), wherein a total weight of the oil and the modified cellulose polymer in the dough is from 0.6 to 1.8 wt. %, based on a total weight of the dough.

BRIEF DESCRIPTION OF THE DRAWINGS

The foregoing paragraphs have been provided by way of general introduction, and are not intended to limit the scope of the following claims. The described embodiments, together with further advantages, will be best understood by reference to the following detailed description when considered in conjunction with the accompanying drawings, wherein:

The FIGURE illustrates a process flow diagram for making the microwavable frozen dumplings.

DETAILED DESCRIPTION OF THE INVENTION

In the following description, it is understood that other embodiments may be utilized and structural and operational changes may be made without departure from the scope of the present embodiments disclosed herein.

Definitions

In the present disclosure, rice grains are classified according to their conventional classification and specification. As such, "paddy rice" (rough rice) refers to rice which has retained its husk after threshing, "husked rice" (brown rice or cargo rice) refers to paddy rice from which only the husk has been removed, and "milled rice" (white rice) refers to husked rice from which all or part of the bran and germ or embryo have been removed by milling. The general term "grain" or "rice grain" may refer to any or all of these classifications, unless otherwise specified.

Further, the following rice grain size categories are used herein:
Long grain rice:
When the husked rice has a length/width ratio of 3.1 or more
When the milled rice has a length/width ratio of 3.0 or more.
Medium grain rice:
When the husked rice has a length/width ratio of 2.1-3.0
When the milled rice has a length/width ratio of 2.0-2.9.
Short grain rice:
When the husked rice has a length/width ratio of 2.0 or less
When the milled rice has a length/width ratio of 1.9 or less.

As used herein, the phrase "substantially free", unless otherwise specified, refers to a composition/material which contains less than 1 wt. %, preferably less than 0.5 wt. %, preferably less than 0.1 wt. %, preferably less than 0.05 wt. %, preferably less than 0.001 wt. %, preferably 0 wt. % of a particular component, relative to a total weight of the composition/material.

As used herein, the terms "optional" or "optionally" means that the subsequently described event(s) can or cannot occur or the subsequently described component(s) may or may not be present (e.g., 0 wt. %).

Unless otherwise stated, references to a "dumpling" or "dumplings" throughout the disclosure refer to those of the steamed dumpling variety, for example, those having a tender skin texture, which differ from fried or pan-fried dumplings (e.g., gyoza), which tend to have a crispier texture.

Microwavable Frozen Dumpling

The present disclosure is directed to microwavable frozen dumplings, which are dumplings that can be stored in a frozen state, and which upon microwave heating provide cooked dumplings (of the steamed dumpling variety) with a pleasing appearance and texture. As will become clear, the combination of ingredients used to construct the dough and the process by which the dumplings are made contribute to this ability to be microwaved.

The microwavable frozen dumplings of the present disclosure generally include one or more filling ingredients wrapped inside a dough (skin), and can be formed into a variety of shapes, including, but not limited to, a traditional 'half-moon' shape, a triangle shape, a cone shape, a muffin shape, a loaf shape, a ball shape, a folded ring shape, among many others, including any desired skin embossing pattern.

<Filling Ingredients>

In terms of the filling ingredients, it is to be readily appreciated by those of ordinary skill in the art that a wide variety of filling ingredients may be included in the disclosed dumplings for preparation of various dumpling types, including meat-containing dumplings, vegetarian dumplings, and dessert-style dumplings, and thus the filling ingredient is not particularly limited so long as the filling ingredient can be cooked/heated to satisfaction in a microwave oven.

Typical/traditional filling ingredients for dumplings may be included in the microwavable frozen dumplings herein in art appropriate quantities, including meat, vegetables, raw materials such as nuts, nutrients, seasonings/sauces, and the like, with specific mention being made to duck, pork, chicken, beef, lamb, fish, shrimp and other seafood, mushrooms, lettuce, carrots, bamboo shoots, beans, noodles such as bean noodles, corn, zucchini, radishes, peas, cabbage, onions, ginger, peanuts, almonds, desserts, soy sauce, wine, salt, and pepper. When meat products or other raw materials are to be used as filling ingredient(s), pre-cooking, disinfecting, or other sterilization procedures are preferably employed.

<Dough>

The dough herein generally includes the following components: a flour base containing at least a rice flour; an oil; a modified cellulose polymer; and water; and may optionally include various additives such as a colorant, a preservative, a flavoring (e g, salt, sugar, etc.), an enzyme, and a surfactant.

Flour Base

The selection of an appropriate flour base may impact the viscoelasticity, durability, tackiness, absorbency, and water retention properties of the dough, and thus the overall sheetability of the dough and the appearance and texture of any cooked dumpling prepared therefrom. In light of the above, particular preference is given herein to doughs made with a flour base that includes rice flour. In particular, the rice flour component may provide the dumpling skin with a tender mouthfeel after cooking in a microwave oven, while dumplings prepared without the rice flour component may possess an unacceptable rubber texture once heated by microwave.

The rice flour may be obtained by milling a paddy rice, a brown rice, or a milled rice. Preferably, the rice flour employed herein is obtained from a brown or milled rice. Any milling process known by those of ordinary skill in the art may be used to obtain the rice flour, including both dry and wet milling processes. In some embodiments, the rice flour has an average particle size of at least 20 µm, preferably at least 30 µm, preferably at least 40 µm, preferably at least 50 µm, preferably at least 60 µm, preferably at least 70 µm, preferably at least 80 µm, preferably at least 90 µm, preferably at least 100 µm, and up to 500 µm, preferably up to 400 µm, preferably up to 300 µm, preferably up to 200 µm, preferably up to 150 µm, preferably up to 125 µm, although rice flour having average particle sizes above or below these values are also contemplated.

The rice flour used in the flour base may be flour obtained from any rice grain variety, with long grain, medium grain, and short grain rice varieties all being suitable, including mixtures thereof. Long grain rice varieties may include, but are not limited to, standard long grain rice, aromatic long grain rice, and superior long grain rice, with specific mention being made to, basmati, jasmine, calmati, standard long grain white rice, standard long grain brown rice, and the like, and combinations thereof. For example, the rice flour may be sourced from L-205, L-206, Calmati-201, Calmati-202, and A-202 rice varieties.

Medium grain rice varieties may include, but are not limited to, arborio, loto, baldo, carnaroli, calasparra, bomba, vialone, California medium grain, medium grain ribe, standard medium grain, premium medium grain, and the like, and combinations thereof, as well as other types of specialty medium grain varieties, with specific mention being made to M-104, M-202, M-205, M-206, M-208, M-401, and M-402 medium grain rice varieties. In preferred embodiments, the rice flour is sourced from California medium grain rice, a particular example of which is RFU-0801 (finely ground California medium grain rice flour), available from California Cereal Products, Inc.

Short grain rice varieties may include standard short grain rice, glutinous short grain rice, premium short grain rice, low amylose short grain rice, and the like, and mixtures thereof. Exemplary short grain rice varieties may include, but are not limited to, japonica rice including both uruchimai and mochigome, bomba, valencia, short grain arborio rice, for example standard short grain (e.g., S-102), koshihikari, hitomebore, akitakomachi, tamaki, calhikari (e.g., calhikare-201 and 202), calmochi (e.g., calmochi-101 and 203), and calamylow (e.g., calamylow-201) rice grain varieties.

The most edible portion of rice is starch, which typically accounts for 75 to 80 wt. % of the rice. In addition, rice typically contains 5 to 8 wt. % of proteins, while lipids, fiber, and ash each typically account for about 1 to 3 wt. % of rice. Rice is also usually enriched with minerals and vitamins. Rice starch is composed of two components, amylose and amylopectin, and the relative amounts of these components in the starch of the rice flour may influence the viscoelasticity and texture of the dough, as well as the eating and cooking quality of any skin made from the dough.

In some embodiments, the rice flour employed in the dough is obtained from rice (e.g., a medium grain rice variety) having an apparent amylose content (AAC) of at least 10 wt. %, preferably at least 11 wt. %, preferably at least 12 wt. %, preferably at least 13 wt. %, preferably at least 14 wt. %, preferably at least 15 wt. %, preferably at least 16 wt. %, preferably at least 16.5 wt. %, preferably at least 17 wt. %, and up to 23 wt. %, preferably up to 22 wt. %, preferably up to 21 wt. %, preferably up to 20 wt. %, preferably up to 19 wt. %, preferably up to 18.5 wt. %, based on a total starch content of the rice. The apparent amylose content (AAC) may be measured according to the amylose/amylopectin assay kit/procedure, K-AMYL 06/18, commercially available from Megazyme.

In preferred embodiments, the rice flour employed in the dough is a glutinous (sweet) rice flour obtained from a glutinous (sweet) rice having an apparent amylose content (AAC) of less than 5 wt. %, preferably less than 4 wt. %, preferably less than 3 wt. %, preferably less than 2 wt. %, preferably less than 1 wt. %, preferably less than 0.5 wt. %, preferably 0 wt. %, based on a total starch content of the glutinous rice. In particular, the inclusion of glutinous rice flour in the dough provides the skin of the dumpling (after microwave cooking) with a satisfying tender texture, more so than other varieties of rice flour.

The amount of the rice flour employed in the dough may vary, but typically the rice flour is present in an amount of at least 1 wt. %, preferably at least 2 wt. %, preferably at least 2.5 wt. %, preferably at least 3 wt. %, preferably at least 3.5 wt. %, preferably at least 4 wt. %, preferably at least 4.5 wt. %, and up to 10 wt. %, preferably up to 9 wt. %, preferably up to 8 wt. %, preferably up to 7 wt. %, preferably up to 6 wt. %, preferably up to 5 wt. %, based on a total weight of the dough.

In addition to rice flour, the dough may further include a wheat flour, preferably unenriched wheat flour. When present, the wheat flour is preferably used as the predominant flour in the flour base, with the wheat flour constituting at least 50 wt. %, preferably at least 60 wt. %, preferably at least 70 wt. %, preferably at least 80 wt. %, and up to 99 wt. %, preferably up to 98 wt. %, preferably up to 96 wt. %, preferably up to 95 wt. %, preferably up to 94 wt. % of a total weight of the flour base. The amount of the wheat flour employed in the dough may vary, but typically the wheat flour is present in an amount of at least 50 wt. %, preferably at least 52 wt. %, preferably at least 54 wt. %, preferably at least 56 wt. %, preferably at least 58 wt. %, preferably at least 60 wt. %, and up to 75 wt. %, preferably up to 70 wt. %, preferably up to 68 wt. %, preferably up to 66 wt. %, preferably up to 64 wt. %, preferably up to 62 wt. %, based on a total weight of the dough.

Without being bound by theory, it is believed that the combination of rice flour and wheat flour provides an advantageous dough matrix in terms of viscoelasticity and durability while also enabling the dough matrix to retain water at a higher-than-normal rate compared to when either rice flour or wheat flour is used alone. Accordingly, preferred doughs of the present disclosure are those employing a mixture of wheat flour and rice flour in a weight ratio of from at least 10:1, preferably at least 11:1, preferably at least 12:1, preferably at least 13:1, and up to 20:1, preferably up to 18:1, preferably up to 16:1, preferably up to 14:1.

In addition to the rice flour and wheat flour, the dough base may optionally include other types of grain flour, suitable examples of which include, but are not limited to, corn flour, potato flour, tapioca flour (derived from cassava), amaranth flour, arrowroot flour, sorghum flour Jowar), teff flour, chia seed flour, pure buckwheat flour, gram flour (derived from chick-peas), millet flour, oat flour, quinoa flour, almond flour, coconut flour, tigernut flour, and garbanzo flour, as well as combinations thereof.

Preferred doughs are those which include a combination of rice flour and wheat flour, and are substantially free of other types of grain flour, such as those listed above.

Oil

The dough herein is also formulated with an oil, which may serve to i) minimize the tackiness of the dough so that the dough may be sheeted without sticking to processing machinery or equipment (e.g., rollers, belts, sheeting machines, etc.), ii) improve the elasticity of the dough to prevent the formation of holes when manipulated/sheeted, and/or iii) provide a moistening effect to the dough and thus impart a soft chewable texture to the cooked dumpling skin.

As the oil component, various edible oils may be utilized, with plant-based oils being preferred. Suitable examples of plant-based oils may include, but are not limited to, soybean oil, olive oil, vegetable oil, canola oil, jojoba oil, coconut oil, palm oil, rice germ oil (rice bran oil), or any other vegetable oil known in the art, as well as mixtures thereof. In preferred embodiments, the oil is soybean oil.

The amount of oil may be adjusted as needed to provide suitable anti-sticking properties, improve dough elasticity, and/or provide the dough with a moistening effect. Typically, the dough is formulated with at least 0.5 wt. %, preferably at least 0.75 wt. %, preferably at least 1 wt. %, preferably at least 1.25 wt. %, and up to 5 wt. %, preferably up to 4 wt. %, preferably up to 3 wt. %, preferably up to 2 wt. %, preferably up to 1.75 wt. %, preferably up to 1.5 wt. % of the oil, based on a total weight of the rice dough composition. When employed in the above amounts, a wide range of processing techniques and machinery/equipment can be utilized during the manufacture of the dough component of the microwavable frozen dumplings of the present disclosure, and the cooked (microwaved) dumplings prepared therefrom may have a moist and tender skin texture.

Modified Cellulose Polymer

The dough herein is also formulated with a modified cellulose polymer. The modified cellulose polymer may enhance the water retention properties of the dough upon microwave heating. Specifically, doughs formulated with a modified cellulose polymer have a sufficiently high moisture content, and retain moisture well even after being subjected to microwave heating followed by periods of cooling. As a result of these moisture retention capabilities, cooked dumplings can be prepared with a moist and tender skin texture akin to traditional steamed dumplings.

Doughs may be formulated with the modified cellulose polymer in an amount of at least 0.1 wt. %, preferably at least 0.2 wt. %, preferably at least 0.3 wt. %, preferably at least 0.4 wt. %, preferably at least 0.5 wt. %, and up to 5 wt. %, preferably up to 4 wt. %, preferably up to 3 wt. %, preferably up to 2 wt. %, preferably up to 1 wt. %, preferably up to 0.75 wt. %, preferably up to 0.6 wt. %, based on a total weight of the dough.

Particularly desirable doughs, in terms of sheetability and microwavability, are those having a total weight of the oil and the modified cellulose polymer of at least 0.6 wt. %, preferably at least 0.8 wt. %, preferably at least 1 wt. %, preferably at least 1.2 wt. %, preferably at least 1.4 wt. %, preferably at least 1.6 wt. %, and up to 1.8 wt. %, preferably up to 1.78 wt. %, preferably up to 1.75 wt. %, based on a total weight of the dough.

Suitable examples of the modified cellulose polymer include, but are not limited to, methylcellulose (MC), ethyl cellulose (EC), hydroxyethyl cellulose (HEC), hydroxypropyl cellulose (HPC), hydroxyethyl methyl cellulose (HEMC), ethyl hydroxyethyl cellulose (EHEC), methyl ethyl hydroxyethyl cellulose (MEHEC), hydroxypropyl methyl cellulose (HPMC), carboxymethyl cellulose (CMC), polyanionic cellulose (PAC), as well as modified versions thereof, for example, hydrophobically modified versions of any of the above, as well as mixtures thereof.

In terms of providing the dough with desirable moisture content, modified cellulose polymers are preferably employed which have excellent water-binding properties, for example, those with a water-binding capacity (g water/g of polymer) of at least 100, preferably at least 115, preferably at least 125, preferably at least 130, preferably at least 140, preferably at least 150. For example, cooked dumplings having excellent body and texture may be obtained by incorporating a modified cellulose polymer (such as carboxymethyl cellulose) with a water-binding capacity of 140 to 160 g of water per g of polymer (carboxymethyl cellulose) into the dough.

In preferred embodiments, the modified cellulose polymer is carboxymethyl cellulose (CMC). Carboxymethyl cellulose is a cellulose derivative with carboxymethyl groups ($-CH_2-COOH$) bound to some of the hydroxyl groups of the glucopyranose monomers that constitute the cellulose backbone. Carboxymethyl cellulose may be in the form of a free acid or a carboxylate salt (e.g., sodium salt, potassium salt, etc.). Preferably the carboxymethyl cellulose used herein is sodium carboxymethyl cellulose (the carboxymethyl groups are in the form of a sodium salt).

The carboxymethyl cellulose may have any degree of substitution (D.S.), defined as the number of hydroxyl groups substituted with carboxymethyl groups per anhydroglucose unit, with those having a D.S. of at least 0.6, preferably at least 0.65, preferably at least 0.7, preferably at least 0.75, preferably at least 0.8, preferably at least 0.9, and up to 1.5, preferably up to 1.4, preferably up to 1.3, preferably up to 1.2, preferably up to 1.1, preferably up to 1.0, preferably up to 0.95 being preferred, in particular those having a medium D.S. (0.8-0.95) being most preferred.

A wide range of carboxymethyl cellulose polymers in terms of viscosity may be employed in the dough herein, for example, a viscosity (as a 2 wt. % aq. solution) ranging from 300 to 80,000 cP, with those having a viscosity as a 2 wt. % solution of at least 10,000 cP, preferably at least 20,000 cP, preferably at least 30,000 cP, preferably at least 35,000 cP, preferably at least 40,000 cP, and up to 80,000 cP, preferably up to 70,000 cP, preferably up to 60,000 cP, preferably up to 55,000 cP, preferably up to 50,000 cP, preferably up to 45,000 cP, being the most preferred.

Suitable carboxymethyl celluloses are those that are food grade (of high purity), for example, those having a total salt content of less than 0.5 wt. %, preferably less than 0.4 wt. %, preferably less than 0.3 wt. %, preferably less than 0.2 wt. %, preferably less than 0.1 wt. %, preferably less than 0.05 wt. %, preferably 0 wt. %, relative to the total weight of the carboxymethyl cellulose (dry basis). In terms of purity, the total salt content refers to the levels of salt byproducts included in the material, the salt byproducts generally being those generated during manufacture of the carboxymethyl cellulose (e.g., sodium chloride, sodium glycolate, etc.), and not the salt form of carboxymethyl groups installed onto the cellulose backbone structure.

Examples of acceptable carboxymethyl celluloses may include, but are not limited to, AQUALON products available from Ashland and WALOCEL products available from Dupont, such as WALOCEL CRT 40000PA (a sodium carboxymethyl cellulose having a D.S. of 0.82-0.95 and a viscosity of 40,000 cP as a 2 wt. % aqueous solution).

As will become clear, it has been unexpectedly discovered that doughs formulated with a rice flour, an oil, and a modified cellulose polymer(s)—and in particular a carboxymethyl cellulose—can be heated from a frozen state in a microwave without hardening, cracking, bubbling, or drying out (see e.g., Table 5, Examples 8-17). Without being bound by theory, it is believed that the modified cellulose polymer binds and retains water/moisture at a higher-than-normal rate, without imparting an unnatural chewy or gummy texture to the dough matrix.

On the other hand, it has been found that the use of other thickening/stabilizing agents—even those commonly employed in dumpling products such as xanthan gum—provides doughs with diminished water/moisture retention properties that do not perform well under microwave heating (see e.g., Tables 4 and 6, Examples 1-7 and 20). In such cases, the cooked dumplings produced through microwave heating tend to possess an unnatural mouthfeel, for example a gel-like texture. Examples of such other thickening/stabilizing agents may include, but are not limited to, additional starch materials (i.e., a starch component, other than the starch originating from the flour(s) used in the flour base, which is added to the dough to increase the total starch content) such as cornstarch, tapioca starch, arrowroot starch, wheat starch, supplemental rice starch (i.e., rice starch added to increase the total starch content obtained from rice flour alone), potato starch, sweet potato starch, sago starch, and mung bean starch, including modified or pre-gelatinized versions of such starches;

fiber such as wheat fiber, corn fiber, barley fiber, rye fiber, oat fiber, rice fiber, cellulose powder fiber, sugar beet fiber, inulin, soy fiber, pea fiber, citrus fiber, cottonseed fiber, mustard fiber, leguminous fiber;

egg products including egg yolk and egg whites as well as modified egg products such as enzyme modified egg yolks (e.g., egg yolks modified with a phospholipase such as phospholipase A); lyophilized (powdered) egg yolks; lyophilized (powdered) egg whites; egg yolks which are fortified with additional emulsifiers such as (i) polysorbates such as polyoxyethylene sorbitan monolaurate, polyoxyethylene sorbitan monopalmitate, polyoxyethylene sorbitan monostearate, polyoxyethylene sorbitan monooleate, and sorbitan tristearate, (ii) phospholipids such as phosphatidic acid, phosphatidylethanolamine, phosphatidylcholine, phosphatidylserine phosphatidylinositol, phosphatidylinositol phosphate, phosphatidylinositol bisphosphate, phosphatidylinositol triphosphate, ceramide phosphoryl choline, ceramide phosphorylethanolamine and ceramide phosphoryl glycerol, (iii) casein, (iv) albumin, and (v) glycerol monostearate, with specific mention being made to YELKIN, ULTRALEC, BEAKIN, PERFORMIX, and THERMOLEC each available from Archer Daniels Midland;

gums (also called hydrocolloids), such as xanthan gum (e.g., SATIAXANE CX 90, available from Cargill), guar gum, ghatti gum, karaya gum, tragacanth gum, carrageenan, psyllium seed gum, tamarind seed gum, alginates including salts of alginic acid (e.g., sodium alginate, potassium alginate, ammonium alginate, calcium alginate, etc.) and modified alginates (e.g., propylene glycol alginates, with specific mention being made to KIMILOID products such as KIMILOID HV, available from Kimica Corp.), locust bean gum, agar, tapioca, gelatin, pectin, gum arabic (acacia), including mixtures or blends of gums such as CARAGUM available from TIC gums; said gums being used alone or optionally in combination with a gelling agent such as calcium acetate, calcium citrate, calcium gluconate, calcium glycerol phosphate, mono-, di-, and tri-calcium phosphate, calcium sulfate, calcium carbonate, calcium lactate, and calcium phosphite.

It should be noted that while modified cellulose polymers (e.g., carboxymethyl cellulose) can be considered a thickening/stabilizing agent, the modified cellulose polymers of the present disclosure are considered to be different and distinct from the "other thickening/stabilizing agents", at least due to their different behavior in the dough. While such other thickening/stabilizing agents are not necessarily excluded from use in the doughs herein, their optional use is to be accompanied by the modified cellulose polymer for acceptable texture outcomes. However, preferred microwavable frozen dumplings are those prepared from doughs in which the modified cellulose polymer is the only thickening/stabilizing agent present, i.e., those which are substantially free of other thickening/stabilizing agents, and in particular, those which are substantially free of xanthan gum.

Water

The doughs further include water, typically in amounts of at least 25 wt. %, preferably at least 28 wt. %, preferably at least 30 wt. %, preferably at least 31 wt. %, preferably at least 32 wt. %, and up to 50 wt. %, preferably up to 45 wt. %, preferably up to 40 wt. %, preferably up to 35 wt. %, preferably up to 33 wt. %, based on a total weight of the dough. The water employed in the manufacture of the dough is preferably water at elevated temperature, such as water having a temperature of at least 40° C., preferably at least 45° C., preferably at least 48° C., and up to 75° C., preferably up to 70° C., preferably up to 65° C., preferably up to 60° C., preferably up to 55° C., preferably up to 50° C.

Additives

Various additives known to those of ordinary skill in the art may be optionally formulated into the dough in art appropriate levels. A non-exhaustive list of optional additives includes, but is not limited to, a colorant, a preservative, a flavoring (e.g., salt, sugar, etc.), an enzyme, and a surfactant.

The dough described herein generally produces a dumpling skin (after cooking) that is white, off-white, or cream in color. However, when it is desired, various colorants, including both pigments and dyes, may optionally be added into the dough to impart a desired color. For example, traditional steamed dumplings possess a slight yellow color, and thus to match the traditional skin color of a steamed dumplings, the doughs herein may be optionally formulated with a colorant in the yellow-orange spectrum. Examples of food-grade yellow-orange colorants include, but are not limited to, turmeric, saffron, golden beet dye, beta-carotene, Yellow No. 5 (Tartrazine, E102), Yellow No. 6 (Sunset Yellow FCF, E110), and Quinoline Yellow (E104), as well as mixtures thereof. Of course, as well understood by those of ordinary skill in the art, the colorant is not limited to those in the yellow-orange spectrum, and a variety of colorants in other color spectrums can be utilized herein to produce cooked dumplings having a variety of colors (e.g., red, orange, green, brown, etc.) including, but not limited to, Blue No. 1 (Brilliant Blue FCF, E133), Blue No. 2 (Indigotine, E132), Green No. 3 (Fast Green FCF, E143), Red No. 3 (Erythrosine, E127), Red No. 40 (Allura Red AC, E129), as well as mixtures thereof. When desired, the colorant is typically employed in the dough in an amount of up to 1 wt. %, preferably up to 0.5 wt. %, preferably up to 0.3 wt. %, preferably up to 0.2 wt. %, preferably up to 0.1 wt. %, preferably up to 0.05 wt. %, based on a total weight of the dough.

As the microwavable frozen dumplings of the present disclosure are intended to be kept in cold/freezer storage until ready-to-eat, the use of preservatives is not necessary or preferred. However, one or more preservatives may be optionally included in the dough when desired in amounts from 0.001 wt. %, preferably from 0.01 wt. %, preferably from 0.1 wt. %, and up to 2 wt. %, preferably up to 1 wt. %, preferably up to 0.5 wt. %, based on a total weight of the dough. The preservatives may act as antimicrobials, stabilizers, and/or antioxidants to prevent the growth of mold, the growth of bacteria, degradation or chemical breakdown (e.g., oxidative degradation) so as to keep the dough and/or filling ingredients fresh for longer periods of time. Preservatives suitable for use in food are well-known to those skilled in the art. Illustrative examples include, but are not limited to, benzoates (e.g., sodium benzoate, benzoic acid), sorbates (e.g., sorbic acid, sodium sorbate, potassium sorbate), citrates (e.g., citric acid), propionates (e.g., propionic acid), ascorbates (e.g., ascorbic acid, sodium ascorbate), and mixtures thereof.

The doughs may also be optionally formulated with various flavorings or seasonings, for example, in amounts up to 5 wt. %, preferably up to 4 wt. %, preferably up to 3 wt. %, preferably up to 2 wt. %, preferably up to 1 wt. %, preferably up to 0.5 wt. %, preferably up to 0.1 wt. %, based on a total weight of the dough. Particular mention is made to salts such as sodium chloride, calcium chloride, potassium chloride, magnesium chloride, as well as sulfate salts of calcium, potassium, and magnesium, and mixtures thereof, for example sea salt, and the like; as well as sugar or sweetening agents such as sucrose, maltitol, sorbitol, lactose, trehalose, and the like. Preferably, the dough is substantially free of flavorings.

The microwavable frozen dumplings of the present disclosure are made from dough which is unleavened, and thus preferred doughs herein are substantially free of leavening agents. Leavening agents may include both enzyme leavening agents as well as chemical leavening agents, with specific mention being made to *Saccharomyces cerevisiae* (e.g., baker's yeast, beer), *Clostridium perfringens*, as well as enzymes described in US2003/0206994A1—incorporated herein by reference in its entirety, baking soda, baking powders that include baking soda and/or acids/acid salts like cream of tartar, tartaric acid, monocalcium phosphate, sodium aluminum sulfate, dicalcium phosphate, glucono delta-lactone, ammonium bicarbonate, ammonium carbonate, including any hydrates thereof, and any mixtures thereof. However, in order to improve the binding qualities of the dough and to form a more durable connection/network, binding enzymes may optionally be included in the dough, for example in amounts of at least 0.0001 wt. %, preferably at least 0.001 wt. %, preferably at least 0.01 wt. %, preferably at least 0.1 wt. %, and up to 0.5 wt. %, preferably up to 0.4 wt. %, preferably up to 0.35 wt. %, based on a total weight of the dough. An example of a suitable binding enzyme is a transglutaminase enzyme, which may be optionally added as a processing aid to link proteins (for example via isopeptide bond formation of a glutamine and a lysine residue) present in the dough to afford a more networked and durable dough, with specific mention being made to ACTIVA RM, available from Ajinomoto, as well as any transglutaminase enzyme designed for or capable of being used for plant-based applications, such as AtPng1p described in Mea, M. D. et al. Plant Physiol. 2004, 135(4), pg. 2046-2054 and U.S. Pat. No. 6,030,821A—each incorporated herein by reference in its entirety. In preferred embodiments, binding enzymes are not employed in the doughs herein.

Food-grade surfactants may be optionally included into the dough disclosed herein, including, but are not limited to, glycerides (mono-, di-, and tri-glycerides), lactylates, lactates, phosphates, stearates, sorbates, sorbitan esters, and the like, with specific mention being made to acetylated hydrogenated coconut glycerides, acetylated hydrogenated cottonseed glyceride, acetylated hydrogenated soybean oil glyceride, acetylated lard glyceride, acetylated mono- and diglycerides of fatty acids, acetylated tartaric acid esters of mono- and diglycerides of fatty acids, acyl lactylates, calcium lactate, calcium phosphate monobasic monohydrate, calcium phosphate tribasic, calcium/sodium stearoyl lactylate, calcium stearate, calcium stearoyl lactylate, canola oil glyceride, capric triglyceride, caprylic/capric triglyceride, and capryllic triglyceride, just to name a few.

<Moisture Content>

In addition to the specific combination of ingredients described above used to construct the dough, the process used for making the disclosed microwavable frozen dumplings has also been found to effect the moisture content of the dough, contributing to the microwavability thereof.

In order to provide frozen dumplings which can be easily cooked through microwave cooking to provide cooked dumplings with excellent appearance and texture (referred to herein as "microwaveable"), the inventors have found that it is desirable for the dough used to construct the frozen dumpling to have a moisture content (wet weight basis) of at least 52.0 wt. %, preferably at least 52.5 wt. %, preferably at least 53.0 wt. %, preferably at least 53.5 wt. %, preferably at least 54.0 wt. %, preferably at least 54.5 wt. %, preferably at least 55.0 wt. %, preferably at least 55.5 wt. %, preferably at least 56.0 wt. %, preferably at least 56.5 wt. %, preferably at least 57.0 wt. %, preferably at least 57.5 wt. %, preferably at least 58.0 wt. %, preferably at least 58.5 wt. %, preferably at least 58.6 wt. %, preferably at least 58.7 wt. %, preferably at least 58.8 wt. %, preferably at least 58.9 wt. %, preferably at least 59.0 wt. %, preferably at least 59.1 wt. %, for example a moisture content in the range of 52.0 to 60 wt. %, or any range in between, as determined for example using a moisture analyzer (e.g., MB27 Moisture Analyzer, available from Ohaus). At moisture contents below the above minimum value, dumplings skins may be dry, cracked, hard, gelled, and/or chewy after microwave heating.

A Method of Making a Microwavable Frozen Dumpling

In addition to the combination of dough ingredients as discussed above, the inventors have discovered that a boiling-based process—involving (i) boiling of a raw dumpling and (ii) freezing of the boiled dumpling—provides frozen dumplings with a sufficiently high dough moisture content, rendering the frozen dumplings 'microwavable'.

While the microwavable frozen dumplings disclosed herein may be made using manual methods—for example by manual steps of mixing/kneading the dough, forming/shaping the dumpling by hand, etc. as is known by those of ordinary skill in the art—preferred methods involve the use of mechanical equipment, either bench-top or line-run, for commercial manufacture. For the purposes of illustration, an exemplary method will be now discussed with reference to the process flow diagram shown in the FIGURE.

The dough itself may be prepared by any method/suitable technique known to those of ordinary skill in the art. By way of example, the dough may be manufactured by first preparing a dry mix of all dry (non-liquid) ingredients (e.g., flour base, modified cellulose polymer, etc.), and separately, a wet mix of all wet (liquid) ingredients (e.g., water, oil, colorant, etc.).

The ingredients that constitute the dry mix may be added into a vessel in any order and mixed together by stirring, agitating, and/or blending, and this mixing may be accomplished manually or by a mixing machine. Preferably, the dry ingredients are mixed until a uniform distribution of each of the ingredients is achieved throughout the dry mix. Alternatively, a pre-made dry mix may be obtained and subsequently used to make the dough, for example, the dry mix may be a stand-alone commercial product that is obtained (e.g., purchased) and used as is.

Similarly, the ingredients that constitute the wet mix may be added into a vessel in any order and mixed together by stirring, agitating, and/or blending, and this mixing may be accomplished manually or by a mixing machine. Preferably, the wet ingredients are mixed until a uniform distribution of each of the ingredients is achieved throughout the wet mix. In preferred embodiments, the wet mix is prepared with a weight ratio of water to oil of at least 5:1, preferably at least 10:1, preferably at least 15:1, preferably at least 20:1, preferably at least 25:1, and up to 100:1, preferably up to 80:1, preferably up to 60:1, preferably up to 40:1, preferably up to 30:1. In preferred embodiments, the water used to make the wet mix is above room temperature, for example at a temperature of at least 40° C., preferably at least 45° C., preferably at least 48° C., and up to 75° C., preferably up to 70° C., preferably up to 65° C., preferably up to 60° C., preferably up to 55° C., preferably up to 50° C. In this way, when the wet mix is combined with the dry mix, the hot water may partially gelatinize the starch constituent present in the dry mix, leading to dough with improved binding properties and a reduced occurrence of tearing or breaking during any subsequent shaping processes.

The wet mix may then be combined with the dry mix, which can be accomplished by either adding the wet mix to the dry mix, or adding the dry mix to the wet mix. The addition of the wet mix to the dry mix (or vice versa) may be performed all at once, or may be performed slowly/portion wise, and with concomitant mixing (S1). The mixing (e.g., stirring, agitating, blending, beating, or whipping) is preferably performed mechanically in a dough mixer such as a countertop mixer or a commercial mixer.

Upon sufficient mixing, the resulting dough mix may then be conveyed to a loafer (S2) to form the dough. Here, the dough mix from the dough mixer may be kneaded, worked, pressed, and/or folded in a loafer to establish the dough network such that the dough is capable of being sheeted and molded into a desired dumpling shape. Any loafer known to those of ordinary skill in the art may be used in the methods herein.

Separately, any desired filling ingredient or combination of filling ingredients may be added to a filling mixer, such as a countertop mixer or a commercial mixer, whereby the filling ingredients may be stirred, agitated, blended, beat, or whipped, preferably until a homogenous filling mixture is generated (S3).

Next, the dough from the loafer and the filling mixture from the filling mixer may be each conveyed to a forming machine which assembles and forms/shapes the dumpling (S4). Suitable forming machines for forming dumplings are known to those of ordinary skill in the art, and the disclosed methods are not limited to a particular type of forming machine. In general, suitable forming machines are configured to form the dumplings utilizing sequential operations, an example sequential operation is outlined below: first, the dough may be sheeted through one or more mills to provide a dough sheet of desirable quality and thickness; next, the filling mixture may be injected between dough sheets; the filled dough may then pass through a die of predetermined geometric sections, such as semicircle, half-moon shape, etc., and as the filled dough passes, the dumpling may be cut away from the dough sheet, resulting in a filled and sealed dumpling. Additional shaping and/or embossing operations may be optionally performed to work the dumpling into any desired shape or design. At this stage, the dough of dumpling is raw (uncooked) and so the dumpling may be accurately referred to as a raw dumpling.

The methods of the present disclosure next involve boiling the raw dumpling to form a boiled dumpling (S5). Preferred boiling operations are those which result in only partial cooking of the raw dumpling, whereby the starch component present in the dough is partially converted into a gelatinous form, but where the boiling operation is stopped before the dumpling is completely cooked (i.e., stopped before the starch component becomes fully cooked).

The boiling step in the disclosed methods may be accomplished, for example, through parboiling or hot water blanching of the raw dumpling. In preferred embodiments, the raw dumpling is boiled by hot water blanching. Examples of hot water blanchers which may be used herein include, but are not limited to, blanching baskets, rotary screw blanchers or rotary drum blanchers, belt spray blanchers, reel blanchers, and pipe blanchers, any of which may be optionally outfitted with a built-in cooling zone for halting the boiling process.

The boiling operation may be performed by immersing the raw dumpling into hot water having a temperature of at least 70° C., preferably at least 75° C., preferably at least 80° C., preferably at least 82° C., preferably at least 84° C., preferably at least 86° C., preferably at least 88° C., preferably at least 90° C., preferably at least 92° C., and up to 99° C., preferably up to 98° C., preferably up to 97° C., preferably up to 96° C., preferably up to 95° C. For example, in a rotary drum blancher, the raw dumplings may be fed via a gravity chute or in-feed flume into a cook zone cylinder which is bottom-filled with hot water at the above temperature range, where the raw dumplings can be advanced through the bottom of the cook zone cylinder with a rotating auger or helical screw. In preferred embodiments, the raw dumpling is immersed into hot water which is maintained at a constant temperature within the above temperature range throughout the boiling procedure. Alternatively, the boiling operation may be performed by spraying the raw dumplings with hot water at the above temperature range, for example, as the raw dumplings are conveyed on a belt in a belt spray blancher.

Boiling times may vary depending on the boiling temperatures utilized, the thickness of the dough, etc. Typically, the raw dumpling is boiled for at least 1 minute, preferably at least 2 minutes, preferably at least 3 minutes, preferably at least 4 minutes, and up to 10 minutes, preferably up to 9 minutes, preferably up to 8 minutes, preferably up to 7 minutes, preferably up to 6 minutes, preferably up to 5 minutes. Of course, boiling times other than those above may be utilized so long as the raw dumpling is partially cooked without becoming overcooked (completely cooked).

The boiling step has been found to play a role in the methods herein for producing frozen dumplings which are microwaveable that is, which can be easily cooked from a frozen state through microwave cooking to provide cooked dumplings with excellent appearance and texture. In particular, doughs described herein which are subjected to the aforementioned boiling step (S5) (e.g., hot water blanching) have been found to possess a desirable moisture content (wet weight basis) of at least 52.0 wt. %, preferably at least 52.5 wt. %, preferably at least 53.0 wt. %, preferably at least 53.5 wt. %, preferably at least 54.0 wt. %, preferably at least 54.5 wt. %, preferably at least 55.0 wt. %, preferably at least 55.5 wt. %, preferably at least 56.0 wt. %, preferably at least 56.5 wt. %, preferably at least 57.0 wt. %, preferably at least 57.5 wt. %, preferably at least 58.0 wt. %, preferably at least 58.5 wt. %, preferably at least 58.6 wt. %, preferably at least 58.7 wt. %, preferably at least 58.8 wt. %, preferably at least 58.9 wt. %, preferably at least 59.0 wt. %, preferably at least 59.1 wt. %, and thus are suitable for cooking through simple microwave heating (see e.g., Table 5, Examples 8-17).

In contrast, it has been discovered that other (partial) cooking methods, such as steaming, are inferior to boiling. For example, the use of (partial) steam cooking rather than boiling has been found to impart to the dough a low moisture content (e.g., less than 50 wt. %), and unacceptable texture and appearance outcomes upon microwave heating of the frozen dumpling, such as a dry and bubbled skin appearance and a very tough and rubbery texture (see e.g., Table 6, Example 23). Thus in preferred embodiments, the methods of making the microwavable frozen dumplings described herein involve boiling the raw dumpling, and do not involve any other kind of cooking operation such as steaming, frying (e.g., oil frying, pan frying, etc.), and/or baking operations.

Once the boiling operation (S5) is deemed complete, the boiled dumplings may then be cooled (S6), preferably through rapid cooling, to halt the cooking process. Rapid cooling may involve subjecting the boiled dumplings to cold water, cooled air, or a combination of both. Cooling the boiled dumplings with cold water may involve immersing the boiled dumplings into a cold water bath/cold water chiller, or by passing the boiled dumplings through a cold spray of water. The cold water may have a temperature of at least 1° C., preferably at least 2° C., preferably at least 3° C., preferably at least 4° C., and up to 15° C., preferably up to 10° C., preferably up to 8° C., preferably up to 6° C., preferably up to 5° C. Cooled air cooling may involve circulating cooled air over the boiled dumplings, for example, using cooling fans. The cooling step (S6) may take place in stand-alone equipment, or may be associated with the boiling process, for instance where the hot water blancher includes both a blanching zone and a cooling zone in one device. For example, the hot water blancher may be a rotary drum type cooker-cooler where after being blanched in the cook zone cylinder, the boiled dumplings are advanced to a cool zone cylinder which is bottom-filled with cold water at the above temperature range, where the raw dumplings can continue to advance through the bottom of the cool zone cylinder with a rotating auger or helical screw, and discharged through a discharge chute. The type of cooling utilized, the temperature of the cold water and/or cooled air, as well as the cooling exposure time is not particularly limited so long as the cooling operation halts the boiling operation and prevents the dumplings from being overly cooked (completely cooked). Typically, the boiled dumplings are cooled for at least 30 seconds, preferably at least 1 minute, preferably at least 2 minutes, preferably at least 3 minutes, and up to 10 minutes, preferably up to 8 minutes, preferably up to 6 minutes, preferably up to 4 minutes.

After optionally sorting the boiling dumplings (S7), e.g., in a shaker table, the boiled dumplings are then frozen (S8) to form the microwavable frozen dumplings. The freezing step herein may involve standard freezing practices whereby the boiled dumplings are subjected to temperatures at near the freezing point of water (e.g., 0 to 4° C.) or may involve flash freezing processes whereby the boiled dumplings are subjected to cryogenic temperatures well below the freezing point of water. Freezing of the boiled dumplings may be performed using a traditional standing freezer (e.g., a commercial freezer), a spiral belt freezer, a plate freezer, and the like. From the standpoint of commercial throughput, preferred methods herein include the use of belt/in-line freezers such as spiral freezers.

The microwavable frozen dumplings thus obtained may be packaged and stored (S9) using conventional packaging techniques known by those of ordinary skill in the art, including optional inerting (deoxidizing) procedures.

A Method of Preparing a Cooked Dumpling

The present disclosure also provides methods of preparing cooked dumplings from the microwavable frozen dumplings using microwave heating. One of the main benefits of the methods herein is that they are convenient and simple to perform. The microwavable frozen dumplings are designed such that they may be simply placed into a microwave oven, for example, by placing the microwavable frozen dumpling onto a microwave safe dish (e.g., a plate, bowl, microwave tray, microwave turntable, etc.), or even the bottom surface of the microwave oven interior, left uncovered, and heated using microwave energy.

By way of example, a single microwave frozen dumpling may be heated in a microwave oven at a power of at least 700 W, preferably at least 800 W, preferably at least 900 W, preferably at least 1,000 W, preferably at least 1,100 W and up to 1,500 W, preferably up to 1,400 W, preferably up to 1,300 W, preferably up to 1,200 W, and may be heated for at least 25 seconds, preferably at least 30 seconds, preferably at least 35 seconds, preferably at least 40 seconds, and up to 90 seconds, preferably up to 75 seconds, preferably up to 60 seconds, preferably up to 55 seconds, preferably up to 50 seconds, preferably up to 45 seconds, or until reaching an internal temperature of at least 40° C., preferably at least 45° C., preferably at least 50° C., and up to 75° C., preferably up to 70° C., preferably up to 65° C., preferably up to 60° C., preferably up to 55° C. Of course, microwave times/powers above or below these ranges are also contemplated herein, and as is well known to those of ordinary skill in the art, the length of microwave heating and the microwave power may be adjusted according to the microwave oven manufacturer's instructions, the number of microwavable frozen dumplings desired to be cooked, the type of dumpling to be cooked (e.g., meat dumplings versus dessert type dumplings), etc.

While their use is contemplated in the disclosed methods, there is no need for, and the methods are preferably performed without, microwave coverings, specialty containers, or specialty heating packaging. This is because the dough of the microwavable frozen dumplings has been designed for advantageous moisture retention and a texture profile akin to traditional steamed dumplings in the absence of such coverings/containers/packaging.

Examples of microwave coverings include, but are not limited to, plastic bags; plastic wraps such as cling films, polyethylene food wraps (e.g., SARAN wrap from S.C. Johnson & Son, Inc.), and polyvinylidene chloride food wraps; paper-based coverings such as paper towel coverings; wetted coverings such as moistened paper towel coverings; microwavable plastic coverings such as microwavable plate covers/splatter guards made from polypropylene, polycarbonate, silicone, and the like.

Examples of specialty containers include, but are not limited to, steamable bags, steamable trays, or any other type of packaging designed to hold water and contact the dumpling with water throughout the cooking process, for example, those described in U.S. Pat. No. 6,329,008B1—incorporated herein by reference in its entirety.

Examples of specialty heating packaging include, but are not limited to, heat susceptors or microwave-absorbing heat generators such as those made of a metallized film, a ceramic, or a metal (e.g., aluminum flakes), for example those described in US2003/0203076A1 and U.S. Pat. No. 9,974,324B2—each incorporated herein by reference in its entirety.

For utmost convenience, the microwavable frozen dumplings are preferably not thawed prior to heating in the microwave oven, but are subjected to microwave heating directly from a frozen state.

The methods herein do not require the addition of water to the microwave oven to effect boiling, steaming, or to moisturize the frozen dumpling during the microwave heating process. Preferably, the microwavable frozen dumpling is not in contact with water during the heating. When it is stated that the microwavable frozen dumpling is not in contact with water during the heating, the "water" refers to supplemental water specifically added to aid the heating of the dumpling or to prevent drying of the dumpling skin—for example, the microwavable frozen dumpling is preferably not submerged (fully or partially) in water, not placed above a reservoir of water to effect steaming as the water is heated, not covered in a covering wetted with water to moisturize the dumpling skin, etc., during the microwave heating. In this context, the "water" does not include residual moisture present in normal atmosphere (e.g., humid air) nor to the residual moisture present on the surface of the microwavable frozen dumpling itself (e.g., tiny ice crystals present on the microwavable frozen dumpling from the freezing process).

Preferred methods are those in which microwave heat is the only heat source employed for converting the microwavable frozen dumpling into a cooked dumpling, and no other heating technique is employed such as frying (e.g., oil frying, pan frying, etc.), boiling, steaming, baking, and the like.

The examples below are intended to further illustrate microwavable frozen dumplings, methods of manufacture, and methods of making cooked dumplings therefrom, and are not intended to limit the scope of the claims.

EXAMPLES

Frozen Dumplings
Doughs

Several example doughs used to construct the frozen dumplings are given in Tables 4-6. The amount of each component is expressed in terms of weight percentage relative to a total weight (100%) of the dough. RFU-0801 is a finely ground California medium grain rice flour available from California Cereal Products, Inc. The sweet rice flour used is Koda Farms Mochiko Sweet Rice Flour. The xanthan gum used is SATIAXANE CX 90, available from Cargill. WALOCEL CRT 40000PA is a sodium carboxymethyl cellulose having a D.S. of 0.82-0.95 and a viscosity of 40,000 cP as a 2 wt. % aqueous solution, available from Dupont. The hot water used to formulate the doughs was at a temperature of 120° F. (48.9° C.).

* denotes the example is a comparative example.

Filling Ingredients

The filling ingredients used in the following examples were as follows: chicken, cabbage, onions, green onions, sugar, soy sauce, oil, chicken base, cornstarch, salt, mirin, teriyaki seasoning, and yeast extract.

Preparation Methods

The frozen dumplings were prepared using bench-top equipment unless indicated as a "line-run" (where the microwavable frozen dumplings were prepared in a line-run using commercial processing equipment), according to the following procedure (and depicted in the FIGURE):

All dry (non-liquid) ingredients (e.g., flours, CMC, xanthan gum, etc.) were combined to form a dry mix, and separately, all wet (liquid) ingredients (e.g., water, soybean oil, etc.) were combined to form a wet mix. The dry mix and the wet mix were combined in a dough mixer (countertop mixer for bench-top processes or a commercial mixer for line-run processes) where they were mixed together until a uniform dough mix was generated.

The dough mix was then formed into a dough in a loafer. The sheetability of the dough was analyzed at this stage as described below.

Separately, the filling ingredients were added to a filling mixer (countertop mixer for bench-top processes or a commercial mixer for line-run processes) and mixed until a homogenous filling mixture was generated.

The dough from the loafer and the filling mixture from the filling mixer were each transferred to a forming machine to form/shape the raw dumplings.

The raw dumplings were then either:
i) (Process: Boil) boiled in a hot water blancher with hot water at a temperature of 199 to 203° F. (92.8 to 95° C.) and a 5 minute hot water blanch time to form boiled dumplings,
or
ii) (Process: Steam) steamed using a steam blancher by placing the raw dumplings onto a perforated tray, steam injection 100%, at a temperature of 20° C. for 9 minutes to form steamed dumplings The boiled dumplings from i) or the steamed dumplings from ii) were then cooled in a cooling zone associated with the hot water blancher or the steam blancher, respectively, using cold water at a temperature of 35 to 40° F. (1.7 to 4.4° C.) at a 3 minute cold water time.

After cooling, the boiled/steamed dumplings were sorted in a shaker table and then sent to a spiral belt freezer where they were frozen to form the frozen dumplings. The moisture and sensory analysis was performed at this stage as described below.

Evaluation Methods

Dough Sheetability

The doughs were analyzed for their sheetability while being sheeted in the dumpling forming machine and rated as "A", "B", "B(-)" or "C" according to Table 1.

TABLE 1

Sheetability rating

| Rating | Description |
|---|---|
| A | Dough formed is a continuous sheet without holes or tears<br>Dough does not stick to the roller or processing equipment<br>Dough is durable |
| B | Dough could be formed into a continuous sheet without holes or tears using bench-top equipment<br>Further improvements to durability are desirable |
| B(-) | Dough performs similarly to B using bench-top equipment<br>Dough developed holes during line-run processing |
| C | Dough could not be sheeted<br>Dough sticks to the roller<br>Holes develop on the dough surface<br>Dough peels or flakes on the surface |

Moisture Analysis

Equipment:

Moisture analyzer—MB27 Moisture Analyzer, available from Ohaus

Food processor—Kitchen Aid Model: KFC3516CU

Protocol:

Five (5) frozen dumplings were removed from the freezer, placed onto a plate, covered with plastic wrap, and allowed to thaw to room temperature (75° F./23.0° C.) over 20 minutes.

The filling was removed from each dumpling, the dough was collected/combined, placed into the food processor, and chopped/mixed until uniform.

5 g of the chopped/mixed dough from the food processor was placed into the moisture analyzer (set at 160° C.), and the moisture content of the dough was recorded (wet weight basis, wt. % based on a total weight of the dough sample).

Sensory Analysis

Equipment:

1,200 W Microwave

Protocol:

The frozen dumplings were placed onto a plate and microwaved (at 1,200 W) for 40 seconds until reaching an internal temperature of 135° F. (57.2° C.).

The cooked dumplings were evaluated by trained panelists with experience in profiling and prescreened for their sensory acuity. The trained panelists evaluated the cooked dumplings according to appearance and texture, and provided a rating for each according to the rating criteria in Tables 2 and 3, respectively.

TABLE 2

Appearance rating

| Rating | Description |
|---|---|
| Good | No dryness on the surface<br>No bubbles in the skin<br>Light yellow color |
| OK | No dryness on the surface<br>No bubbles in the skin<br>Color is slightly flawed<br>(too light/white or too dark/yellow) |
| Not Good | Dryness on the surface<br>Bubbles present in the skin<br>Dark yellow color |

TABLE 3

Texture rating

| Rating | Description | Primary outcomes |
|---|---|---|
| A | Acceptable | Tender to bite<br>Remains tender upon cooling |
| U | Unacceptable | Tough or rubbery<br>Firm or hard to the bite (al dente)<br>Unnatural gummy or gel-like texture<br>Dry mouthfeel in a hot state or as dumpling begins to cool<br>Squeaks or sticks to teeth |

Frozen dumplings receiving an "OK" or "Good" appearance rating as well as an "A" (acceptable) texture rating upon microwave heating were considered to be "microwavable" (i.e., microwavable frozen dumpling).

Evaluation

Frozen dumpling Examples 1-7 (comparative) are presented in Table 4. As shown, doughs prepared using a mixture of wheat and rice flour, xanthan gum, carboxymethyl cellulose, tapioca flour, and egg white powder were not functional in terms of their sheetability (stuck to rollers and peeled/flaked on the surface), and provided unacceptable texture to the cooked dumpling (Examples 1-2). Removing the tapioca flour and egg white powder resulted in slight improvements, but still inferior dough (Examples 3 and 4). Lowering both the amount of medium grain rice flour (RFU-0801) and xanthan gum (SATIAXANE CX 90) provided doughs that could be sheeted, but such doughs provided cooked dumplings with unacceptable textures (Examples 5-7). Specifically, panelists preferred the texture of Example 5>Example 6>Example 7, but all examples exhibited a strange, unnatural texture with a gel-like mouthfeel.

Microwavable frozen dumpling Examples 8-17 are presented in Table 5. Removing the xanthan gum from Example 7 and correspondingly increasing the amount of wheat flour provided Example 8 which was able to be sheeted using bench-top equipment and provided cooked dumplings with an acceptable (albeit borderline acceptable) texture. Replacing the medium grain rice flour (RFU-0801) with glutinous (sweet) rice flour provided cooked dumplings with excellent texture (Example 9). However, when the dumplings of Example 9 were made using a line-run manufacturing procedure, the dough developed holes and thus a "B(-)" rating for dough sheetability (Example 10). Minor decreases in the amount of oil and/or carboxymethyl cellulose led to only modest improvement in sheetability (Examples 11-14), but these doughs still developed holes during line-run manufacture.

When the amount of oil and carboxymethyl cellulose were each reduced by 50% compared to Example 9, the doughs were able to be sheeted in bench-top and line-run processing and the cooked dumplings were of excellent texture (Examples 15-17). The addition of turmeric provided cooked dumplings with desirable color (Example 16), although higher loadings of turmeric provided the cooked dumplings with a color that was too dark yellow (Example 17).

Using Example 16 (inventive) as a basis for modification, frozen dumpling Examples 18-23 (comparative) were produced and the results are presented in Table 6. In terms of the function of the glutinous (sweet) rice flour, removing the sweet rice flour (Example 18) or replacing the sweet rice flour with normal rice flour (Example 19) provided poor texture results, with Example 18 possessing a rubbery texture and Example 19 possessing a more firm to the bite texture (somewhat al dente).

In terms of thickening agents, replacing the carboxymethyl cellulose with xanthan gum (Example 20) provided poor texture results upon microwave heating (strange gel-like texture). When the carboxymethyl cellulose (WALOCEL CRT 40000PA) was removed (Example 21), the cooked dumpling was tender initially but dried out as it began to cool.

Likewise, removal of the soybean oil (Example 22) provided the cooked dumpling with an unacceptable texture, namely a tough skin that dried out very quickly after microwave heating.

To evaluate the effect that the boiling procedure has on the frozen dumplings' microwavability, Example 23 was produced with an identical composition to Example 16, except that Example 23 was manufactured by steaming the raw dumpling instead of the use of hot water blanching (boiling). It was found that the dough of Example 23 prepared through the steaming procedure had a significantly lower moisture content of 46.42 wt. % compared to that of Example 16 (59.10 wt. %) prepared through hot water blanching (boiling) of the raw dumpling. This was found to effect the texture profile of Example 23, which produced a cooked dumpling with an "unacceptable" texture (very tough and rubbery, sticks to the teeth) and a "not good" appearance rating (dark yellow color, dry surface, bubbles formed under the skin).

TABLE 4

Frozen Dumpling Examples 1-7

| Dough Ingredient | *Ex. 1 | *Ex. 2 | *Ex. 3 | *Ex. 4 | *Ex. 5 | *Ex. 6 | *Ex. 7 |
|---|---|---|---|---|---|---|---|
| Wheat flour (unenriched) | 44.92 | 39.64 | 50.21 | 55.00 | 58.00 | 61.00 | 59.50 |
| RFU-0801 | 7.93 | 13.21 | 13.21 | 10.00 | 6.00 | 3.00 | 4.50 |
| Xanthan gum | 4.23 | 4.23 | 4.23 | 1.00 | 1.50 | 1.50 | 1.00 |
| WALOCEL CRT 40000PA | 0.63 | 0.63 | 0.63 | 0.50 | 0.50 | 0.50 | 1.00 |
| Soybean oil | 2.11 | 2.11 | 2.11 | 2.50 | 2.50 | 2.50 | 2.50 |
| Tapioca flour | 4.23 | 4.23 | — | — | — | — | — |
| Egg white powder | 6.34 | 6.34 | — | — | — | — | — |
| Hot water | 29.61 | 29.61 | 29.61 | 31.00 | 31.50 | 31.50 | 31.50 |
| Total | 100.00 | 100.00 | 100.00 | 100.00 | 100.00 | 100.00 | 100.00 |
| Process | Boil | Boil | Boil | Boil | Boil | Boil | Boil |
| Dough Sheetability | C | C | C | C | B | B | B |
| Cooked Dumpling Texture | U | U | U | U | U | U | U |

TABLE 5

Frozen Dumpling Examples 8-17

| Dough Ingredient | | Ex. 8 | Ex. 9 | Ex. 10[a] | Ex. 11[a] | Ex. 12[a] | Ex. 13[a] | Ex. 14[a] | Ex. 15[a] | Ex. 16 | Ex. 17 |
|---|---|---|---|---|---|---|---|---|---|---|---|
| Wheat flour (unenriched) | | 60.50 | 60.50 | 60.50 | 60.50 | 60.75 | 60.75 | 60.48 | 61.00 | 60.95 | 60.85 |
| RFU-0801 | | 4.50 | — | — | — | — | — | — | — | — | — |
| Sweet rice flour | | — | 4.50 | 4.50 | 4.50 | 4.50 | 4.50 | 4.50 | 4.50 | 4.50 | 4.50 |
| WALOCEL CRT 40000PA | | 1.00 | 1.00 | 1.00 | 1.00 | 0.75 | 0.75 | 0.65 | 0.50 | 0.50 | 0.50 |
| Tumeric (60 mesh) | | — | — | — | — | — | — | — | — | 0.05 | 0.15 |
| Soybean oil | | 2.50 | 2.50 | 2.50 | 1.75 | 1.88 | 1.25 | 1.62 | 1.25 | 1.25 | 1.25 |
| Hot water | | 31.50 | 31.50 | 31.50 | 32.25 | 32.12 | 32.75 | 32.75 | 32.75 | 32.75 | 32.75 |
| Total | | 100.00 | 100.00 | 100.00 | 100.00 | 100.00 | 100.00 | 100.00 | 100.00 | 100.00 | 100.00 |
| Process | | Boil | Boil | Boil | Boil | Boil | Boil | Boil | Boil | Boil | Boil |
| Dough | Sheetability | B | B | B(−) | B(−) | B(−) | B(−) | B(−) | A | A | A |
| | Moisture (wt. %) | — | — | — | — | — | — | — | — | 59.10[b] | — |
| Cooked Dumpling | Texture | A | A | A | A | A | A | A | A | A | A |
| | Appearance | — | — | — | — | — | — | — | OK | Good | OK |

[a]line-run
[b]moisture content measured on dough prepared using bench-top equipment. Frozen dumplings of Ex. 16 produced in full scale production had an average dough moisture content of 53.3 wt. % (average of 6 samples)

TABLE 6

Frozen Dumpling Examples 16 and 18-23

| Dough Ingredient | | Ex. 16 | *Ex. 18 | *Ex. 19 | *Ex. 20 | *Ex. 21 | *Ex. 22 | *Ex. 23 |
|---|---|---|---|---|---|---|---|---|
| Wheat flour (unenriched) | | 60.95 | 65.45 | 60.95 | 60.95 | 61.45 | 60.95 | 60.95 |
| RFU-0801 | | — | — | 4.50 | — | — | — | — |
| Sweet rice flour | | 4.50 | — | — | 4.50 | 4.50 | 4.50 | 4.50 |
| Xanthan gum | | — | — | — | 0.5 | — | — | — |
| WALOCEL CRT 40000PA | | 0.50 | 0.5 | 0.5 | — | — | 0.50 | 0.50 |
| Tumeric (60 mesh) | | 0.05 | 0.05 | 0.05 | 0.05 | 0.05 | 0.05 | 0.05 |
| Soybean oil | | 1.25 | 1.25 | 1.25 | 1.25 | 1.25 | — | 1.25 |
| Hot water | | 32.75 | 32.75 | 32.75 | 32.75 | 32.75 | 34.00 | 32.75 |
| Total | | 100.00 | 100.00 | 100.00 | 100.00 | 100.00 | 100.00 | 100.00 |
| Process | | Boil | Boil | Boil | Boil | Boil | Boil | Steam |
| Dough | Sheetability | A | A | A | A | A | A | A |
| | Moisture (wt. %) | 59.10 | 58.20 | 57.54 | 58.01 | 57.79 | 58.04 | 46.42 |
| Cooked Dumpling | Texture | A | U | U | U | U | U | U |
| | Appearance | Good | Good | Good | Good | Good | Not Good | Not Good |

Where a numerical limit or range is stated herein, the endpoints are included. Also, all values and subranges within a numerical limit or range are specifically included as if explicitly written out.

As used herein the words "a" and "an" and the like carry the meaning of "one or more."

The present disclosure also contemplates other embodiments "comprising", "consisting of" and "consisting essentially of", the embodiments or elements presented herein, whether explicitly set forth or not.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A microwavable frozen dumpling, which is produced by a method comprising:
   boiling a raw dumpling comprising a dough and one or more filling ingredients to form a boiled dumpling; and
   freezing the boiled dumpling to form the microwavable frozen dumpling;
   wherein the dough comprises a rice flour, an oil, and a modified cellulose polymer, and
   wherein the dough does not contain gum, soy fiber, and modified starch.

2. The microwavable frozen dumpling of claim 1, wherein the dough in the frozen dumpling has a moisture content of at least 52.0 wt. %.

3. The microwavable frozen dumpling of claim 1, wherein the raw dumpling is boiled by hot water blanching.

4. A method of preparing a cooked dumpling, comprising:
   heating the microwavable frozen dumpling of claim 1 in a microwave oven without covering the microwavable frozen dumpling.

5. The method of claim 4, wherein the microwavable frozen dumpling is heated in the microwave oven without the use of a heat susceptor or a microwave-absorbing heat generator.

6. The method of claim 4, wherein the microwavable frozen dumpling is not in contact with water during the heating.

7. A method of making the microwavable frozen dumpling according to claim 1, comprising:
   boiling the raw dumpling comprising the dough and the one or more filling ingredients to form the boiled dumpling; and
   freezing the boiled dumpling to form the microwavable frozen dumpling.

8. The method of claim 7, wherein the rice flour is present in the dough an amount of 2 to 10 wt. %, based on a total weight of the dough.

9. The method of claim 7, wherein the rice flour is glutinous rice flour.

10. The method of claim 7, wherein the dough further comprises a wheat flour.

11. The method of claim 10, wherein the wheat flour is present in the dough in an amount of 50 to 75 wt. %, based on a total weight of the dough.

12. The method of claim 10, wherein a weight ratio of the wheat flour to the rice flour is from 10:1 to 20:1.

13. The method of claim 7, wherein the oil is present in the dough in an amount of 0.5 to 5 wt. %, based on a total weight of the dough.

14. The method of claim 7, wherein the oil is soybean oil.

15. The method of claim 7, wherein the modified cellulose polymer is present in the dough in an amount of 0.1 to 5 wt. %, based on a total weight of the dough.

16. The method of claim 7, wherein the modified cellulose polymer is carboxymethyl cellulose.

17. The method of claim 7, wherein a total weight of the oil and the modified cellulose polymer in the dough is from 0.6 to 1.8 wt. %, based on a total weight of the dough.

18. The method of claim 7, wherein the raw dumpling is boiled by hot water blanching.

19. A microwavable frozen dumpling, comprising:
   a dough and one or more filling ingredients;
   wherein the dough comprises a rice flour, an oil, and a modified cellulose polymer,
   wherein the dough does not contain gum, soy fiber, and modified starch, and
   wherein the dough in the frozen dumpling has a moisture content of at least 52.0 wt. %.

20. The microwavable frozen dumpling of claim 19, wherein a total weight of the oil and the modified cellulose polymer in the dough is from 0.6 to 1.8 wt. %, based on a total weight of raw materials for the dough.

21. The microwavable frozen dumpling of claim 19, wherein the rice flour is present in the dough in an amount of 2 to 10 wt. %, based on a total weight of raw materials for the dough.

22. The microwavable frozen dumpling of claim 19, wherein the rice flour is glutinous rice flour.

23. The microwavable frozen dumpling of claim 19, wherein the dough further comprises a wheat flour.

24. The microwavable frozen dumpling of claim 23, wherein the wheat flour is present in the dough in an amount of 50 to 75 wt. %, based on a total weight of raw materials for the dough.

25. The microwavable frozen dumpling of claim 23, wherein a weight ratio of the wheat flour to the rice flour is from 10:1 to 20:1.

26. The microwavable frozen dumpling of claim 19, wherein the oil is present in the dough in an amount of 0.5 to 5 wt. %, based on a total weight of raw materials for the dough.

27. The microwavable frozen dumpling of claim 19, wherein the oil is soybean oil.

28. The microwavable frozen dumpling of claim 19, wherein the modified cellulose polymer is present in the dough in an amount of 0.1 to 5 wt. %, based on a total weight of raw materials for the dough.

29. The microwavable frozen dumpling of claim 19, wherein the modified cellulose polymer is carboxymethyl cellulose.

30. The microwavable frozen dumpling of claim 19, wherein the dough contains no added fiber.

* * * * *